Patented Aug. 3, 1926.

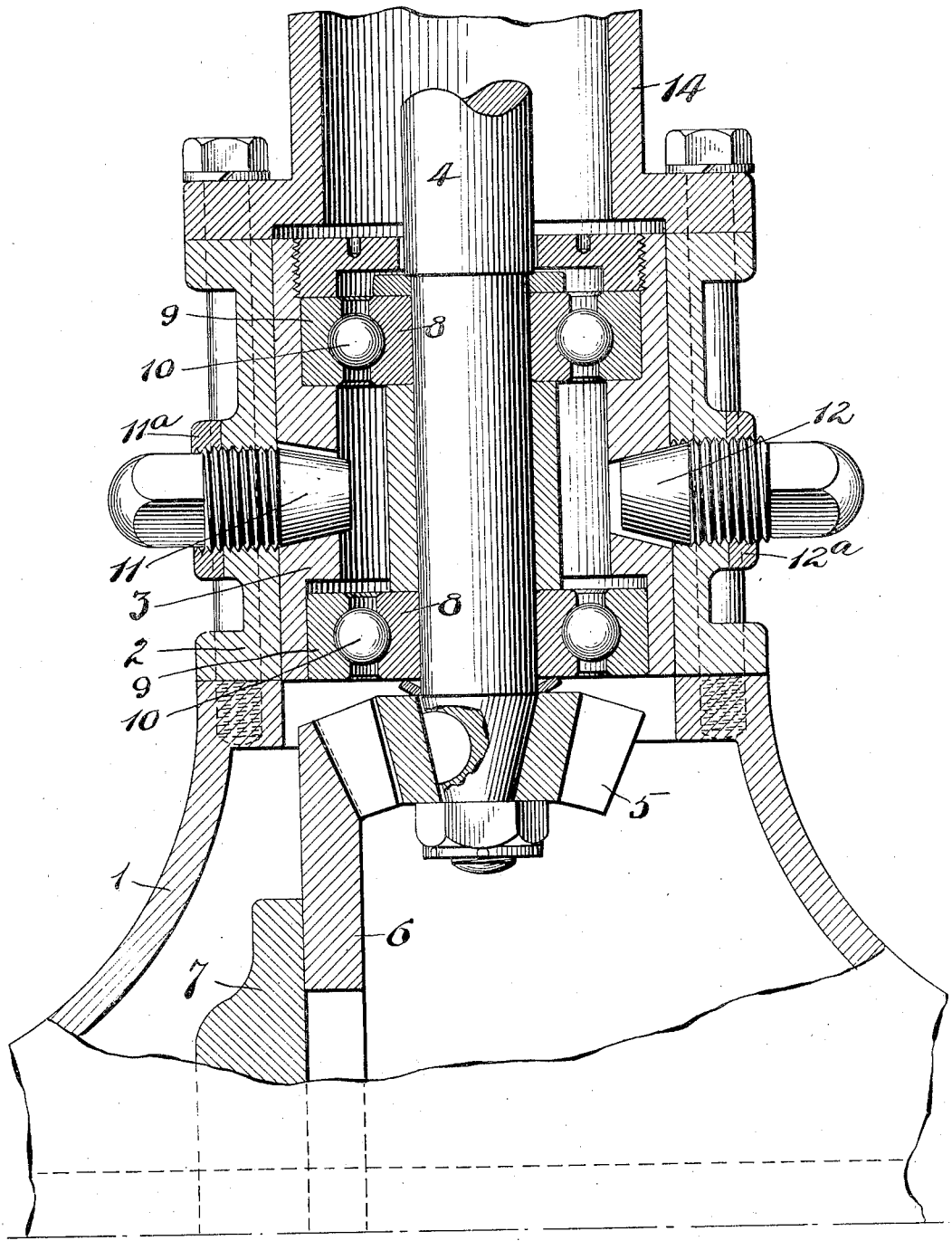

1,594,534

UNITED STATES PATENT OFFICE.

FAYETTE LEISTER, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

ADJUSTABLE MOUNTING FOR DRIVING PINIONS FOR DIFFERENTIAL GEARS.

Application filed January 29, 1926. Serial No. 84,732.

This invention relates to a new and useful mounting and adjusting means for the pinion gear of a differential driving mechanism.

In my co-pending application, Serial No. 78,786, filed January 2, 1926, I have shown and claimed the adjusting mechanism broadly, and I have also claimed it specifically in connection with the adjustment of a differential ring gear mounting.

In the present case the invention is claimed specifically in combination with a novel mounting for a pinion gear. In structures of this type it is important to make accurate adjustment between the driving pinion and the ring gear in the interest, not only of efficiency, but also that the gears may run quietly. By the use of my invention the pinion gear may be moved toward and from the ring gear with such nicety of adjustment as to cause said gears to co-operate in the most advantageous manner.

In the accompanying drawing, the single figure is a view, mainly in section, of that part of a differential mechanism directly associated with the so called "pinion" gear.

In the drawings, 1 represents a differential housing. 2 represents a forward extension therefrom. 3 represents a pinion gear carrier or mounting. 4 represents the rear end of the driving shaft for the pinion. 5 is a pinion gear mounted thereon and meshing with a ring gear 6, secured to the differential gear carrier 7. Anti-friction bearings are provided between the driving shaft 4 and the carrier 3 and, in the preferred form, I employ two well spaced ball bearings, in which 8—8 represent the inner rings of said bearings, the same being secured to the shaft 4 in any suitable manner. 9—9 are outer rings, the same being mounted within the carrier 3 in any suitable manner. 10—10 are anti-friction balls, located in complementary grooves in the aforesaid bearing rings. 11—12 indicate, respectively, wedging means carried by the tubular extension 2 and operatively engaging the pinion gear carrier 3. The pinion gear carrier 3 is constructed to coact with the aforesaid wedging means, so that, by controlling the latter, the carrier and the pinion gear 5 may be adjusted to and fro, whereby the mesh between the pinion gear and the ring gear (so far as the same is controllable by the shifting of the pinion gear) may be accurately adjusted. In the particular form shown, the wedging means are in the form of screws having tapered ends. The carrier 3 is provided with tapered holes, larger than the tapered ends of the screws, but so positioned that the forward wall of one of said openings will engage the forward side of one of the tapered screw ends, for example, the screw end 12, while the rear side of the other opening will engage the rear side of the other adjusting screw 11.

It will be seen by reference to the drawings that, if the adjusting screw 11 is backed out somewhat and the adjusting screw 12 is screwed in to a corresponding extent, this will cause the carrier 3 to move forward, whereby the pinion 5 will move in a corresponding direction and mesh less tightly with the ring gear 6. Reverse movement of the aforesaid parts produces a reverse effect in the meshing of said gears.

Suitable lock nuts 11ª and 12ª may be provided to lock the adjusting screws 11—12 firmly in adjusted position. 14 represents a part of a torsion tube, which may be secured to the forward end of the extension 2 and leads forward in the usual manner to some part (not shown) arranged to take the torsional strain. The driving shaft 4 passes through the tube 14.

It will be observed that the end of the shaft supporting the pinion gear 5, which is frequently subjected to heavy strain, is very firmly supported by bearings spaced well apart, so as to give long effective support. The entire assembly is such that not only may the aforesaid adjustment be conveniently, quickly and accurately effected, but all of the parts are easy of access for cleaning, repair or replacement.

Any suitable means may be provided for rendering the parts dustproof.

Various devices may be employed for holding the parts thus far described in proper assembled relation, such devices being well within the knowledge of the mechanic skilled in the art.

I have shown my invention in a preferred form, being aware that various changes may be made without departure from the spirit or scope thereof.

What I claim is:—

1. An adjustable mounting for a differential driving pinion, comprising a tubular support, a carrier mounted to be movable to and fro therein, a pinion driving shaft carried by said carrier, and wedging means carried by said support and operatively engaging said carrier to positively move the same to and fro to different positions of adjustment.

2. In a structure such as defined by claim 1, with spaced anti-friction bearings between said shaft and carrier.

3. In a construction such as defined in claim 1, said wedging means comprising two independently adjustable members.

4. In a structure such as defined in claim 1, said wedging means comprising two independently adjustable screws having threaded engagement with said support, said screws having tapered ends respectively engaging oppositely positioned shoulders on the carrier.

5. In a device of the character described, a differential housing, a tubular support projecting forwardly therefrom, a non-rotatable tubular carrier slidably mounted in and movable to and fro in said support, a driving shaft mounted to rotate in said carrier, a driving pinion on the rear end of said driving shaft, and wedging means mounted in said support and engaging said carrier and manually operable to positively force the same to and fro in said support and to hold the carrier in said support in different positions of adjustment.

FAYETTE LEISTER.